(12) United States Patent
Donovan et al.

(10) Patent No.: US 6,887,061 B2
(45) Date of Patent: May 3, 2005

(54) METHOD AND APPARATUS FOR MANUFACTURING LATEX FREE MATERIALS

(75) Inventors: James A. Donovan, 8805 Roberts Rd., Odessa, FL (US) 33556; Patrick J. Lamb, New Port Richey, FL (US)

(73) Assignee: James A. Donovan, Tampa, FL (US)

( * ) Notice: Subject to any disclaimer, the term of this patent is extended or adjusted under 35 U.S.C. 154(b) by 476 days.

(21) Appl. No.: 09/999,460

(22) Filed: Nov. 23, 2001

(65) Prior Publication Data

US 2003/0098521 A1 May 29, 2003

(51) Int. Cl.[7] ............................................. B29C 41/28
(52) U.S. Cl. ..................... 425/130; 425/224; 425/373
(58) Field of Search ............................ 425/130, 223, 425/224, 373

(56) References Cited

U.S. PATENT DOCUMENTS

| | | | | |
|---|---|---|---|---|
| 1,894,845 A | * | 1/1933 | Barnes | 425/223 |
| 2,085,532 A | * | 6/1937 | Kinsella | 425/224 |
| 2,346,765 A | * | 4/1944 | Kratz | 425/223 |
| 2,441,235 A | * | 5/1948 | Blair et al. | 425/223 |
| 2,576,317 A | * | 11/1951 | Toulmin, Jr. | 425/224 |
| 3,032,815 A | * | 5/1962 | Gerber | 425/224 |
| 3,749,534 A | * | 7/1973 | Matthews | 425/92 |
| 3,923,941 A | * | 12/1975 | Weaver | 264/73 |
| 4,584,231 A | * | 4/1986 | Knoop | 428/220 |
| 4,710,333 A | * | 12/1987 | Murakami et al. | 425/224 |
| 5,536,158 A | * | 7/1996 | Dresie et al. | 425/224 |
| 6,387,304 B2 | * | 5/2002 | Mukai et al. | 425/224 |

* cited by examiner

*Primary Examiner*—James P. Mackey
(74) *Attorney, Agent, or Firm*—John S Munday

(57) ABSTRACT

Apparatus and method for forming sheets, comprising a pair of drums moving a belt to define a path for curing the sheets. Uncured material preferably polychloroprene, is put on the belt and squeezed between the drum and a roller to adjust the thickness of the layer. The drums rotate at a rate to permit the material to cure between the first and the second drum. Ovens cure the polychloroprene, which is removed at the second drum. The sheet has a thickness of from at least 0.004 inches to more than 0.25 inches. A plurality of sources supply material of at least two colors to form a sheet having stripes. Preferred sheets have an elongation to break of about 150% to about 1500%, a tensile strength of about 5 Mpa to about 50 Mpa and a modulus at 300% elongation of about 1 Mpa to about 10 Mpa.

18 Claims, 2 Drawing Sheets

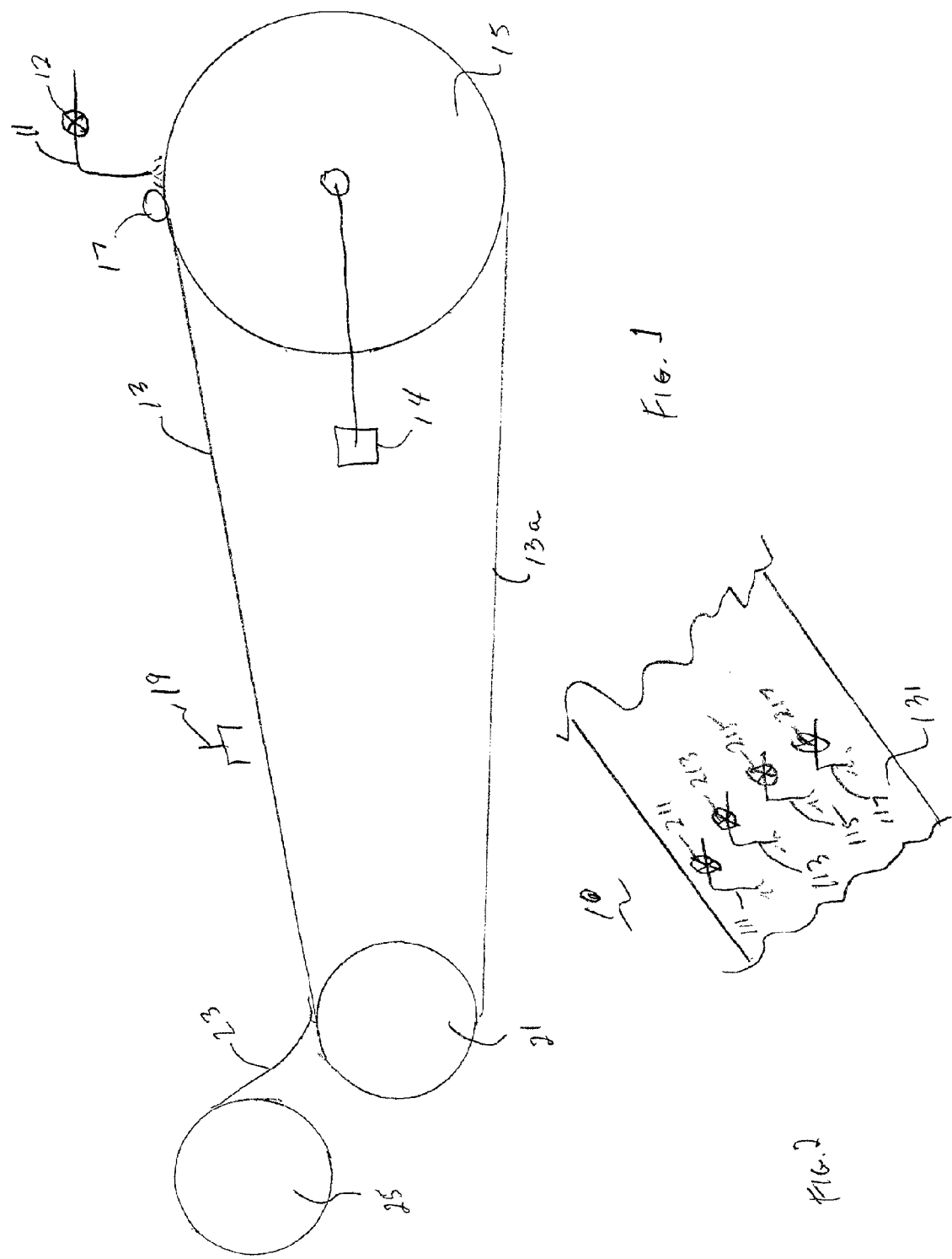

METHOD AND APPARATUS FOR MANUFACTURING LATEX FREE MATERIALS

This invention relates to latex-free elastic exercise bands and tubing and the methods of producing the same. More particularly, the invention relates to the non-allergenic properties of both the exercise bands and tubing, which is made from synthetic rubber.

BACKGROUND OF THE INVENTION

Sheets, elastic exercise bands and tubing are commonly used as a means of providing resistance during exercise, such as during fitness classes and for physical therapy uses. Latex free sheets are also used for clothing, balls, balloons and any areas where rubber characteristics are required. Most of the time bands/tubing are stretched and released a number of times by the body part being worked. For example, a user may hold one end on the band/tube in one hand and stretch and or pull the other half, to work certain muscles.

Commercially available bands/tubing are made from natural rubber latex, and are commonly provided in different resistance levels in order to provide the required resistance level as required for a particular exercise latex sheets/bands are most commonly produced as a cast sheet or a calendared sheet which is then provided in finite lengths or in a continuous roll which can be cut to specific lengths. Latex sheets/bands are also produced similar to latex tubing by an extruding method of allowing a latex material to be pushed through a specific die or by extruding the material through a dog-bone shaped orifice, to form an elongated band having various thicken edges. Both bands and tubing sometimes require handles for the users. One example of exercise equipment based on latex elastic materials is Castellanos U.S. Pat. No. 5,129,647.

The most important concern about the use of latex is the potential for allergy to natural rubber. It has become apparent that contact with latex products can cause an adverse reaction in many individuals. These reactions vary according to the individual and duration and type of latex contact which occurs. As a result, however, many people are required to avoid any and all contact with latex.

Such inability to contact latex products can be of particular disadvantage to healthcare professionals such as physical therapists, who in the normal course of their work are often required to assist their patients in using these resistive exercise devices.

In addition, both latex and thermoplastic elastomers have an unpleasant odor. In order to reduce this unpleasant smell, latex manufacturers are generally forced to provide an odorant in the latex compositions. This is also true of thermoplastic elastomers, which during formulation also use odorants to mask the smell Thus a need exists for a synthetic material for both bands and tubing to provide the desirable resistance characteristics similar to latex without the undesirable effects of latex. Triolo et al. U.S. Pat. No. 4,089,718 describes a process for making thermoplastic elastomeric articles such as, for example, semi-pneumatic tires, comprising the steps of admixing a thermoplastic, elastomeric molding composition including a vulcanizable or otherwise thermosetable elastomer, inert filler materials, a plasticizer and certain processing aids. The molding composition is then milled into a flat sheet, extruded into a tubular shape, cut, shaped and then molded at a temperature less than about 70° F. into thermoplastic elastomeric articles such as, for example, semi-pneumatic tires. This process has not been found to be suitable for conversion to a method of making exercise bands.

While other methods are used to produce a thermoplastic elastomers sheets/bands, they are generally not suited for a substitute for latex. Thermoplastic elastomers are generally manufactured by dipping or other conventional methods, which includes injection molding. Using this technology, the bands are provided in a seamless, substantially ring-shipped form. This method uses a generally elongated die where the thermoplastic elastomers are then immediately cast onto large cooled rollers to lower the temperatures, add strength and to solidify the material in a form of an elongated continuous film. Using this method results in undesirable side edges, thus the edges must be trimmed to provide a more finished appearance.

One method that has recently been proposed is Williams U.S. Pat. No. 5,945,060, in which A non-allergenic resistive exercise device is described. The device is in the form of a relatively thin elongate band of thermoplastic elastomer. In one embodiment of the invention, the device is in the form of a seamless endless band, while in another, the band is substantially strip-shaped. The bands can be textured to enhance the ability of a user to grip them during use, and the bands can also be printed or otherwise ornamented. The exercise devices of the instant invention are latex-free so as to be non-allergenic, do not require supplemental powdering of their surfaces, and are virtually odor-free. Several methods for producing the bands are also described. In one method, the thermoplastic elastomer material is extruded through an elongate-shaped die to form a cast film, which is solidified and cut to the desired length for use. In this method, the die in desirably substantially dog bone-shaped, in order to produce elongate bands having thickened side edges. In another method, the material is extruded as a hollow tube which is inflated with a gas and enlarged to form a large diameter tube having relatively thin walls. The tube is then cut transversely to form a plurality of seamless, substantially ring-shaped bands.

The problem with the methods of Williams U.S. Pat. No. 5,945,060 is that the materials are formed only with difficulty because they are extruded or cast as films and contain irregularities that prevent the product from having commercially suitable quality.

It would be a great advantage to provide a material that is latex free, has no apparent odor, and can be made into resistive objects in the form of sheets and bands for use as exercise equipment and other uses where latex is not well accepted.

It is therefore an object of this invention to provide an odor free, non latex material and method of forming such a material into sheets for use in a variety of latex replacement uses.

Another object is to provide a non latex material formed into sheets and bands for use as exercise equipment Still another object is to provide a method of forming the non latex material in predetermined thicknesses.

Yet another object of the present invention is to provide a method for forming the non latex material while incorporating predetermined colors on some or all of the material Other objects will appear hereinafter.

SUMMARY OF THE INVENTION

It has now been discovered that the above and other objects of the present invention may be accomplished in the following manner. Specifically, the invention comprises a method and apparatus for forming non latex materials such as synthetic rubbers into sheets of specific thicknesses and strengths, as desired. The sheets typically have a thickness of from at least 0.004 inches to 0.25 inches. A plurality of sources supply material of at least two colors to form a sheet having stripes. Preferred sheets have an elongation to break of about 150% to about 1500%, a tensile strength of about 5 Mpa to about 50 Mpa and a modulus at 300% elongation of about 1 Mpa to about 10 Mpa. Other thicknesses and strengths are also possible, depending upon the end use of the material.

The final sheet may be cut from larger sheets while they are being produced or may be cut at a later time. Sheets made according to the present invention may also be formed into shapes such as tubes and continuous bands by proper bonding techniques such as vulcanization. While these Sheets, Bands and Tubing can be produced in single sheets or whole tubing, they can be connected either by cold or heat vulcanization or use of a single type connector. The Sheets, Bands and Tubing can also be textured to enhance the ability of a user to grip them during use, furthermore, all these products can be printed in any color.

The method of making any non latex products comprising of steps that allows a flowable material, including at least about 95% synthetic rubber to flow over a sheet consisting of either metal or rubber under a wide array of tension strength and through a series of stations of precision-guided horizontal, vertical or rotational drives. The synthetic rubber flows over a steel drum onto a hard surface sheet and between a Teflon/Silicone or any type of non-stick material roller to adjust the thickness and width. Thicknesses ranged from about 0.004 inches to 0.25 inches. The width of the sheet being formed can range from as little as one inch to as much as 144 inches or more.

BRIEF DESCRIPTION OF THE DRAWINGS

For a more complete understanding of the invention, reference is hereby made to the drawings, in which:

FIG. 1 is a schematic view illustrating the apparatus of the present invention;

FIG. 2 is an enlarged view of a the details of a portion of the apparatus shown in FIG. 1.

DETAILED DESCRIPTION OF THE PREFERRED EMBODIMENT

Figure 3:
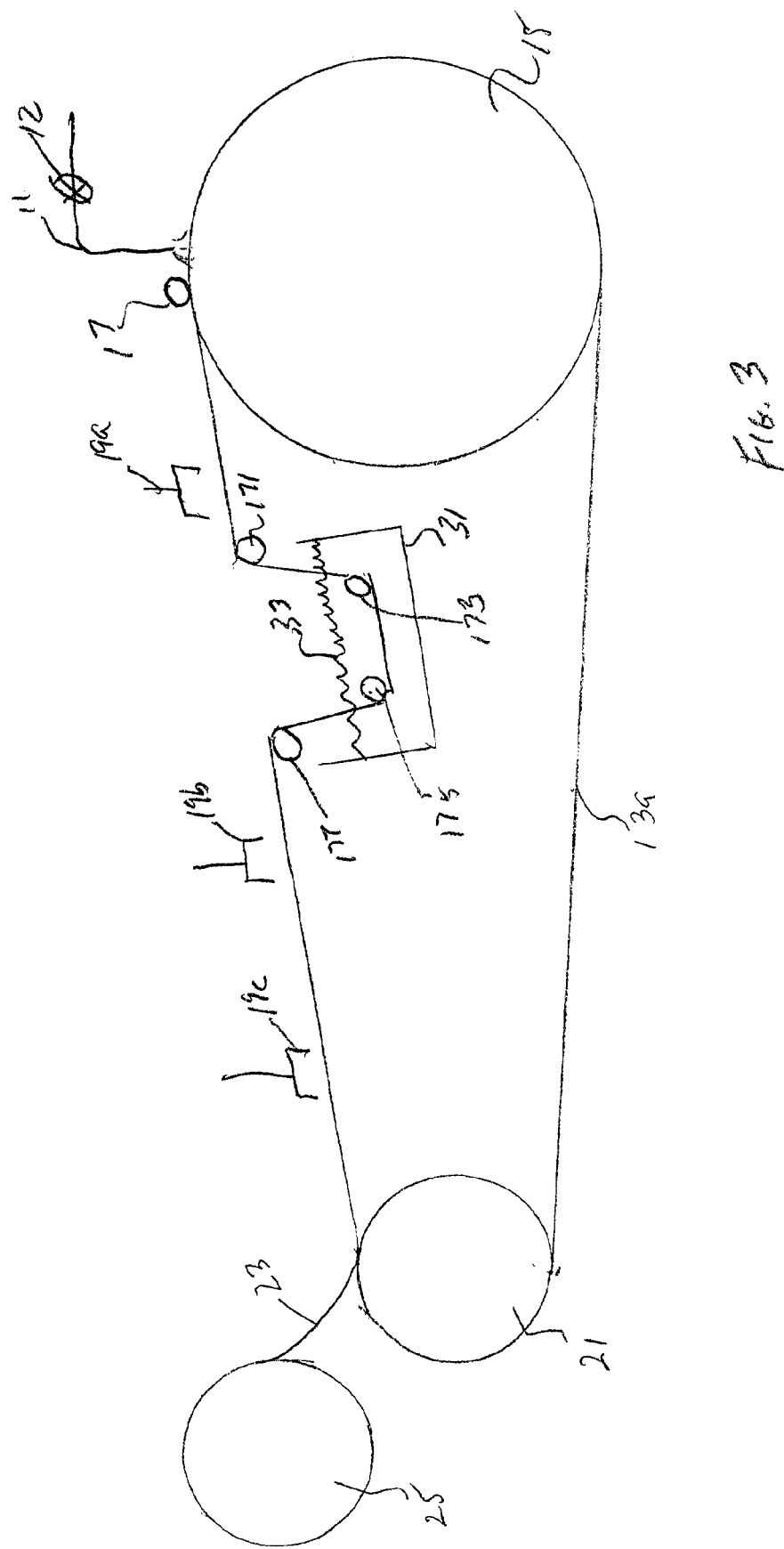
FIG. 3 is another schematic view illustrating other embodiments of the present invention.

The non latex material of this invention may be any of the many forms of synthetic rubbers made from starting materials such as petroleum, natural gas, oil acetylene and coal. Synthetic rubbers are defined, for the purpose of this invention, as those elastomeric materials that can be formed into sheets having suitable properties for exercise equipment, although the products of this invention may be used for any purpose and is not limited to exercise equipment. Preferred synthetic rubbers are polymers and copolymers which form sheets having an elongation to break of about 150% to about 1500%, a tensile strength of about 5 Mpa to about 50 Mpa and a modulus at 300% elongation of about 1 Mpa to about 10 Mpa. Depending on the end use of the rubber, other synthetic rubbers may also be used.

Synthetic rubbers include styrene-butadiene copolymers such as Buna S and SBR rubber, and cis-polybutadiene and cis-polyisoprene. Both of these rubber materials have properties close to that of natural rubber or latex. Other synthetic rubbers are copolymers of acrylonitrile and butadiene, known as nitrile elastomers. Copolymers of isobutylene and 1.3% isoprene, or butyl rubbers are also useful as are ethylene-propylene rubbers. Urethane elastomers consisting of urethane blocks and polyether or polyester blocks, and silicone rubbers are organic derivatives of inorganic polymers, e.g., the polymer of dimethysilanediol. The preferred synthetic rubber is polychloroprene, sold as Neoprene.

The formulation for synthetic rubbers includes emulsifiers, catalysts and curing agents, fillers, antioxidants and other additives normally added to make a final product. In its preferred embodiment, the synthetic rubber used in the present invention is in liquid form, whether a solution, slurry, emulsion, or other mixture of fluids. The preferred method of applying the non latex material of this invention is to pour the uncured form on the curing belt, described herein below, in liquid form, followed by squeezing the poured liquid to a desired thickness by passing the belt containing the liquid between a roller and the surface of the belt while the belt is on the large roller supporting it. The rubber is cured by transferring the gel or film formed on the belt past at least one oven or heat source to cause polymerization and formation of a cured rubber.

As shown in the figures, the apparatus of the present invention, 10 generally, comprises a number of stations or steps at which various processing steps take place to provide the products of the present invention. In FIG. 1, a schematic diagram shows a supply source 11 of non latex material such as synthetic rubber to deposit the material in liquid form on a belt 13, which in turn is supported on a large drum 15. The term "drum" is descriptive and equivalent elements such as cylinders and rollers may also be used. Similarly, the term "belt" is descriptive and equivalent elements can be used. A roller 17 adjusts the thickness of the layer of material. Other devices such as doctor blades and presses can be used, provided they are capable of adjusting the thickness of the uncured material as required.

The continuous rotation of the drum via drive mechanism 14 causes the deposited layer to travel through at least one oven 19 to cure the non latex material as it passes to return drum 21. The cured sheet 23 is lifted from the belt and wound on a second drum 25. The underside 13a of belt 13 is free of material and may be cleaned before it again reaches the supply source 11.

FIG. 2 illustrates the supply system 11 in greater detail. Specifically, the system includes a plurality of pipes 111, 113, 115, and 117 coming from individual supplies of non latex material each controlled by valves 211, 213, 215 and 217 respectively, to produce a continuous sheet of uncured non latex material 131 on belt 13. To the extent that non latex material from pipes 111, 113 and the like are not completely blended together to form a continuous layer 131, the roller 17 of FIG. 1 will complete the blending as roller 17 adjusts the desired thickness by pressure on belt 13 as it passes along first drum 15. The preferred thickness for said non latex material is a thickness of from at least 0.004 inches to more than 0.25 inches.

Another advantage of the present invention is that pipes 111, 113, 115 and 117 can supply non latex materials from different sources, so that, for example, two or more colors can be formed in one continuous sheet. In addition, pipes 111, 113, 115 and 117 can be moved in a regular or irregular pattered alone the axis of drum 15, so that the discharged non latex material, particularly when more than one color is used, results in a series of stripes that may appear to have waves or other patterns in the thus formed sheet The preferred material for the first and second drums and the belt is stainless steel because the polymers used in the present invention tend not to stick to stainless steel. Other materials having this same property can be used, provided they have adequate strength for other features of the present invention. It is important that the belt be kept under tension. Preferred tension is at least 1,000 pounds of tension and preferably at least 2,000 pounds of tension, so that the surface of the belt is stable and does not flex while caring the non latex material as it is cured, said outer surface of said first and second drum and said belt is stainless steel.

Description of the Preferred Embodiment

To demonstrate the efficacy of the present invention, a production unit was constructed and operated to produce non latex sheets for use as exercise equipment. The first drum, made of stainless steel, has a diameter of about six feet and is driven to rotate in a counter clockwise direction as seen in FIG. 1. Uncured polychloroprene, having curing agents and other additives that comprised less than five percent of the liquid, was deposited on a stainless steel belt 13 approximately 150 feet long and attached or carried at the other end by a two foot diameter stainless steel drum. The preferred diameter of the first drum is at least five feet in diameter and the preferred diameter of the second drum is at least one foot in diameter. The preferred length of the belt is at least 50 feet in length.

A tension of 2,000 pounds was maintained on the belt as it rotated on drums 15 and 21, carrying the liquid polychloroprene to a nip formed between roller 17 and belt 13 to cause the polychloroprene to form an uncured sheet having a thickness that was varied during different times of the operation of this apparatus. Roller 17 may have tetrafluoroethylene, silicone or any type of non-stick material covering the roller to adjust the thickness and width. Thicknesses ranged from about 0.004 inches to more than 0.25 inches. The width of the sheet being formed can range from as little as one inch to as much as 144 inches or more, depending on the width of drums 15 and 21, and whether or not more than one sheet is bonded to another at a later processing state.

The drums rotated at a speed of about three feet per minute, and the preferred speed is between one and five feet per minute.

The polychloroprene is then cured as the belt progresses from roller 17 to the return drum 21 by passing through at least one oven 19. Three ovens 19a, 19b and 19c are shown in FIG. 3. Oven temperatures range from 25° C. to 60° C. It is preferred to have at least one wash cycle as well for removal of any solids. The wash cycle is accomplished as illustrated schematically in FIG. 3, by passing the belt holding the curing polychloroprene around a roller 171, into bath vat 31, which is filled with a quantity of water 33, around rollers 173 and 175, out of vat 31 and around roller 177 to drum 21, for removal of sheet 23 on to drum 25 for further processing or use. Finally, the sheet 25 can have at least one contact roller 179, as shown in FIG. 3, for imparting a predetermined texture to said non latex material during curing.

The apparatus was operated for periods of time as long as thirty hours before shutting down for cleaning and maintenance. A wide variety of striped sheets were made, including but not limited to horizontal, vertical and wavy stripes. Colors used included white, orange, green, blue, purple, tan, silver and gold. Color combinations included sheets having a two inch wide top stripe of white and a three inch wide stripe of a specific color, including orange, green, blue, purple, tan, silver and gold. One sheet was made having five stripes, comprising white, orange, green, blue and purple. Another sheet was made having three stripes, comprising tan, silver and gold.

While particular embodiments of the present invention have been illustrated and described, it is not intended to limit the invention to any specific embodiment. The dimensions and materials given are for the preferred embodiment and are not to be construed as limitations on the scope of this invention. The description of the invention is not intended to limit the invention.

What is claimed is:

1. Apparatus for forming sheets from uncured non latex materials, comprising:
   a first drum having a first predetermined diameter and width, said diameter being at least five feet;
   a second drum having a second predetermined diameter and width, said diameter being at least one foot and smaller than said diameter of said first drum, said second drum being spaced from said first drum;
   a continuous belt supported by said first and second drum under tension and having a predetermined length of at least fifty feet in length;
   a drive source for driving said belt over said first and second drums at a predetermined rate of travel;
   a supply source of non latex material positioned to deposit said material in liquid form on said belt;
   a first roller positioned to squeeze said material to adjust the thickness of the layer of material on said belt;
   at least one oven positioned above the non latex material as it is carried by said belt, said drive source moving at said predetermined rate of travel over said predetermined length, said rate and length being sufficient to cure said material; and
   a product receiver for receiving a cured sheet from said belt.

2. The apparatus of claim 1, wherein said first roller produces a thickness of said material of from at least 0.004 inches to more than 0.25 inches.

3. The apparatus of claim 1, wherein said first drum is at least six feet in diameter and said second drum is at least two feet in diameter, said belt having a length of at least one hundred fifty feet.

4. The apparatus of claim 1, wherein said belt is under at least 1,000 pounds of tension.

5. The apparatus of claim 4, wherein said belt is under at least 2,000 pounds of tension.

6. The apparatus of claim 1, wherein said supply source comprises a plurality of separate sources of said liquid material on said belt spaced perpendicularly to the direction of travel of said belt.

7. The apparatus of claim 6, wherein said plurality of separate sources supply said material in two locations to permit supply of said material in at least two colors.

8. The apparatus of claim 7, wherein said locations are selected to cause said at least two colors to form a first predetermined pattern.

9. The apparatus of claim 1, wherein said supply source is moveable in a direction perpendicular to the direction of travel of said belt to provide a second predetermined pattern.

10. Apparatus for forming sheets from uncured non latex materials, comprising:
    first drum means for rotating a belt and having a first predetermined diameter and width, said diameter being at least five feet;

second drum means for rotating a belt and having a second predetermined diameter and width, said diameter being at least one foot and smaller than said diameter of said first drum means, said second drum means being spaced from said first drum means;

continuous belt means for carrying non latex material and supported by said first and second drum means under tension and having a predetermined length of at least fifty feet in length;

drive means for driving said belt means over said first and second drum means at a predetermined rate of travel;

supply means for supplying non latex material, said supply means being positioned to deposit said material in liquid form on said belt means;

first roller means positioned to squeeze said material to adjust the thickness of the layer of material on said belt means;

at least one oven means for curing said material, said oven means being positioned above the non latex material as it is carried by said belt means, said drive means being adapted to move at said predetermined rate of travel over said predetermined length, said rate and length being sufficient to cure said material; and product receiver means for receiving a cured sheet from said belt means.

11. The apparatus of claim 10, wherein said first roller means produces a thickness of said material of from at least 0.004 inches to more than 0.25 inches.

12. The apparatus of claim 10, wherein said first drum means is at least six feet in diameter and said second drum means is at least two feet in diameter, said continuous belt means having a length of at least one hundred fifty feet.

13. The apparatus of claim 10, wherein said belt means is under at least 1,000 pounds of tension.

14. The apparatus of claim 13, wherein said belt means is under at least 2,000 pounds of tension.

15. The apparatus of claim 10, wherein said supply means includes a plurality of separate source means for supplying said liquid material on said belt means spaced perpendicularly to the direction of travel of said belt means.

16. The apparatus of claim 15, wherein said plurality of separate source means supply said material in two locations to permit supply of said material in at least two colors.

17. The apparatus of claim 16, wherein said locations are selected to cause said at least two colors to form a first predetermined pattern.

18. The apparatus of claim 15, wherein said supply source means is moveable in a direction perpendicular to the direction of travel of said belt means to provide a second predetermined pattern.

* * * * *